(12) United States Patent
Okamoto et al.

(10) Patent No.: US 9,490,094 B2
(45) Date of Patent: Nov. 8, 2016

(54) OVERCURRENT PROTECTION APPARATUS

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Ryoya Okamoto, Yokkaichi (JP); Kazuyuki Nakagaki, Yokkaichi (JP); Tomotaka Kurozu, Yokkaichi (JP); Takehiro Hosokawa, Yokkaichi (JP); Yasuyuki Otsuka, Yokkaichi (JP); Akiko Inoue, Yokkaichi (JP); Ryoma Uegaki, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 240 days.

(21) Appl. No.: 14/377,285

(22) PCT Filed: Dec. 26, 2012

(86) PCT No.: PCT/JP2012/083604
§ 371 (c)(1),
(2) Date: Aug. 7, 2014

(87) PCT Pub. No.: WO2013/121685
PCT Pub. Date: Aug. 22, 2013

(65) Prior Publication Data
US 2015/0022931 A1  Jan. 22, 2015

(30) Foreign Application Priority Data
Feb. 15, 2012 (JP) .................. 2012-030106

(51) Int. Cl.
*H05H 5/00* (2006.01)
*H01H 85/08* (2006.01)
(Continued)

(52) U.S. Cl.
CPC .......... *H01H 85/08* (2013.01); *B60R 16/0238* (2013.01); *H01H 85/02* (2013.01); *H01H 85/20* (2013.01); *H01H 85/54* (2013.01); *H02H 3/08* (2013.01); *H01H 2231/026* (2013.01)

(58) Field of Classification Search
CPC ....................................... H01H 85/08
USPC ......................................... 361/104
See application file for complete search history.

(56) References Cited

U.S. PATENT DOCUMENTS 4,224,592 A * 9/1980 Urani ............... H01H 69/02
                                                29/623
4,488,137 A * 12/1984 Rooney ........... H01H 85/055
                                                337/162

(Continued)

FOREIGN PATENT DOCUMENTS

JP   S56-50044 U   5/1981
JP   U-56-50044    5/1981

(Continued)

OTHER PUBLICATIONS

Feb. 26, 2013 International Search Report issued in PCT/JP2012/083604 (with translation).

(Continued)

Primary Examiner — Stephen W Jackson
(74) Attorney, Agent, or Firm — Oliff PLC

(57) ABSTRACT

An overcurrent protection apparatus that is connectable to a battery control unit to protect the battery control unit from an overcurrent. The overcurrent protection apparatus includes a fuse member that is provided with a fuse and a fusible wire that is connected in series to the fuse. The fusible wire is made of a conductor that has a melting point lower than that of copper, and has a fusing current value that is higher than that of the fuse. The fuse member is connected in series to the battery control unit.

8 Claims, 10 Drawing Sheets

(51) Int. Cl.
*B60R 16/023* (2006.01)
*H01H 85/02* (2006.01)
*H01H 85/20* (2006.01)
*H01H 85/54* (2006.01)
*H02H 3/08* (2006.01)

(56) References Cited

U.S. PATENT DOCUMENTS

| | | | | |
|---|---|---|---|---|
| 4,652,848 A | * | 3/1987 | Hundrieser | H01H 85/046 337/297 |
| 5,034,974 A | * | 7/1991 | Yurosko | G03B 42/047 378/165 |
| 5,304,974 A | * | 4/1994 | Denton | H01H 61/02 337/4 |
| 5,329,204 A | * | 7/1994 | Ricca | B60Q 1/1407 307/10.8 |
| 6,043,966 A | * | 3/2000 | Krueger | H01H 69/022 361/104 |
| 7,433,794 B1 | | 10/2008 | Berdichevsky et al. | |
| 2005/0230160 A1 | | 10/2005 | Watanabe et al. | |

FOREIGN PATENT DOCUMENTS

| | | |
|---|---|---|
| JP | A-08-106956 | 4/1996 |
| JP | A-09-017323 | 1/1997 |
| JP | A-2005-297860 | 10/2005 |
| WO | 98/18180 A1 | 4/1998 |

OTHER PUBLICATIONS

Feb. 3, 2016 Search Report issued in European Application No. 12868758.9.

* cited by examiner

OVERCURRENT PROTECTION APPARATUS

The present invention relates to an overcurrent protection apparatus that protects a circuit from an overcurrent.

BACKGROUND

Conventionally, as an overcurrent protection apparatus that protects a circuit from an overcurrent, a fuse is known (see JP 9-17323A).

The fuse is connected in series to a circuit that is to be protected. When an overcurrent flows through this fuse, the fuse is fused (melts and breaks). Accordingly, the flow of the overcurrent through the protection target is suppressed.

When a fuse as described above is used in a circuit in which a current with a relatively low voltage flows, an overcurrent protection function is realized by the fuse being fused.

However, there is a case where both a current with a relatively low voltage and a current with a relatively high voltage flow depending on a configuration of a circuit in which the fuse is arranged. In such a circuit, if an overcurrent with a relatively high voltage flows through the fuse, there is the concern that arcing occurs and an overcurrent flows continuously even after the fuse was fused.

In order to prevent the arcing, use of a high voltage fuse including a fuse element that is covered with arc-extinguishing sand has been considered. However, high voltage fuses are relatively expensive, and thus there is the problem that the manufacturing cost of an overcurrent protection apparatus increases.

The present application was drafted in view of the above-described circumstances, and it is an object to provide an overcurrent protection apparatus whose manufacturing cost is reduced.

The present application relates to an overcurrent protection apparatus that may be connectable to an external circuit to protect the external circuit from an overcurrent, the overcurrent protection apparatus including a fuse member including a fuse and a fusible wire that may be connected in series to the fuse, the fusible wire being made of a conductor that has a melting point lower than that of copper, and having a fusing current value that may be higher than that of the fuse. The fuse member may be connected in series to the external circuit.

According to the present application, when an overcurrent with a relatively low voltage flows, a fuse having a relatively small fusing current value is fused (i.e. blows). Accordingly, the overcurrent is kept from flowing through the external circuit.

On the other hand, when an overcurrent with a relatively high voltage flows, the fuse and the fusible wire are fused. Since arcing occurs even when the fuse is fused, the current will continue to flow through the fuse. Furthermore, even when the fusible wire has been fused, arcing may occur between terminals of the fused fusible wire. However, by the terminals of the fusible wire being melted due to the heat of arcing, the distance between the terminals of the fusible wire increases. Accordingly, arcing disappears and the current is interrupted. In this way, use of the fusible wire eliminates the need to use a high voltage fuse even when an overcurrent with a relatively high voltage flows. As a result, it is possible to reduce the manufacturing cost of the overcurrent protection apparatus.

The following aspects may be included as embodiments of the present application.

At least the fusible wire may be accommodated in a case.

According to the above-described aspect, it is possible to protect members arranged in the vicinity of the overcurrent protection apparatus from arcing that occurs when the fusible wire is fused and from flying pieces of the fused fusible wire.

A wire-side connector may be arranged at an end of an external electric wire that is connected to the external circuit, and an apparatus-side connector that is electrically connected to the fuse member and into which the wire-side connector may be capable of being fitted be provided in the case.

According to the above-described aspect, it is possible to easily electrically connect the external circuit to the overcurrent protection apparatus by fitting the wire-side connector and the apparatus-side connector together.

The fuse may be a fuse for use in a vehicle.

According to the above-described aspect, a fuse for use in a vehicle that is relatively inexpensive can be used, leading to a reduction in manufacturing cost of the overcurrent protection apparatus.

The fuse may be mounted on a printed board.

According to the above-described aspect, it is possible to downsize the overcurrent protection apparatus.

Moreover, the present application relates to an overcurrent protection apparatus that may be installed in a vehicle, the vehicle being provided with a low voltage circuit through which a current with a relatively low voltage flows and a high voltage circuit through which a current with a relatively high voltage flows, the overcurrent protection apparatus being connectable to the low voltage circuit to protect the low voltage circuit from an overcurrent. The overcurrent protection apparatus may further include a fuse member provided with a fuse and a fusible wire that may be connected in series to the fuse, the fusible wire being made of a conductor that has a melting point lower than that of copper, and having a fusing current value that is higher than that of the fuse, wherein the fuse member may be connected in series to the low voltage circuit.

According to the present invention, the overcurrent protection apparatus may be effective when it is installed in a vehicle provided with a low voltage circuit and a high voltage circuit.

Furthermore, a configuration is also possible in which the high voltage circuit includes a battery module in which a plurality of electric cells are connected in series, and the low voltage circuit includes detection electric wires that detect states of the electric cells.

According to the above-described aspect, the overcurrent protection apparatus having a reduced manufacturing cost may be applied to the battery module.

According to the present application, it is possible to reduce the manufacturing cost of an overcurrent protection apparatus.

DETAILED DESCRIPTION

An embodiment will be described with reference to FIGS. 1 to 4. An overcurrent protection apparatus 10 according to the present embodiment may be installed in, for example, a vehicle Ev. The vehicle may be, for example, an electric automobile or a hybrid automobile (see FIG. 1). A battery module Bt serving as a driving source may be installed to an automobile body Bd of the vehicle Ev. The battery module Bt includes a plurality of electric cells (not shown) that may be connected in series to each other. An interior wire harness Wi that is routed in a vehicle interior of the vehicle Ev may be connected to the battery module Bt. This interior wire harness Wi passes through a floor panel Fp and may be connected to one end of an exterior wire harness Wa that is routed outside of the vehicle interior. The other end of the exterior wire harness Wa may be inserted into an engine room in which an engine Eg and the like are accommodated, and may be connected to an interior wire harness Wi that is routed in the engine room. This interior wire harness Wi may be connected to devices such as an inverter Iv or a motor M. The battery module Bt, the interior wire harness Wi, the exterior wire harness Wa, the interior wire harness Wi, the inverter Iv, and the motor M may constitute a high voltage circuit 11 in which a current with a relatively high voltage flows. A current such as a current with a voltage of, for example, 100 V or more flows through the high voltage circuit 11.

Detection electric wires Wb (which can be an example of external electric wires) for detecting the state of the electric cells may be connected to the electric cells of the battery module Bt. The detection electric wires Wb of the present embodiment may be connected to, for example, electrodes of the electric cells (not shown) to detect the voltages of the electric cells. The detection electric wires Wb may be routed to the outside of the battery module Bt and connected to a battery control unit C. This battery control unit C includes a control circuit (an example of an external circuit). The voltages of the electric cells can be detected by the control circuit. The detection electric wires Wb and the battery control unit C may constitute a low voltage circuit 12 in which a current with a relatively low voltage flows. A current, such as a current of about 12 V, for example, flows through the low voltage circuit 12. The voltage of the current that flows through the low voltage circuit 12 may be equal to, or more or less than 12 V.

Figure 1:
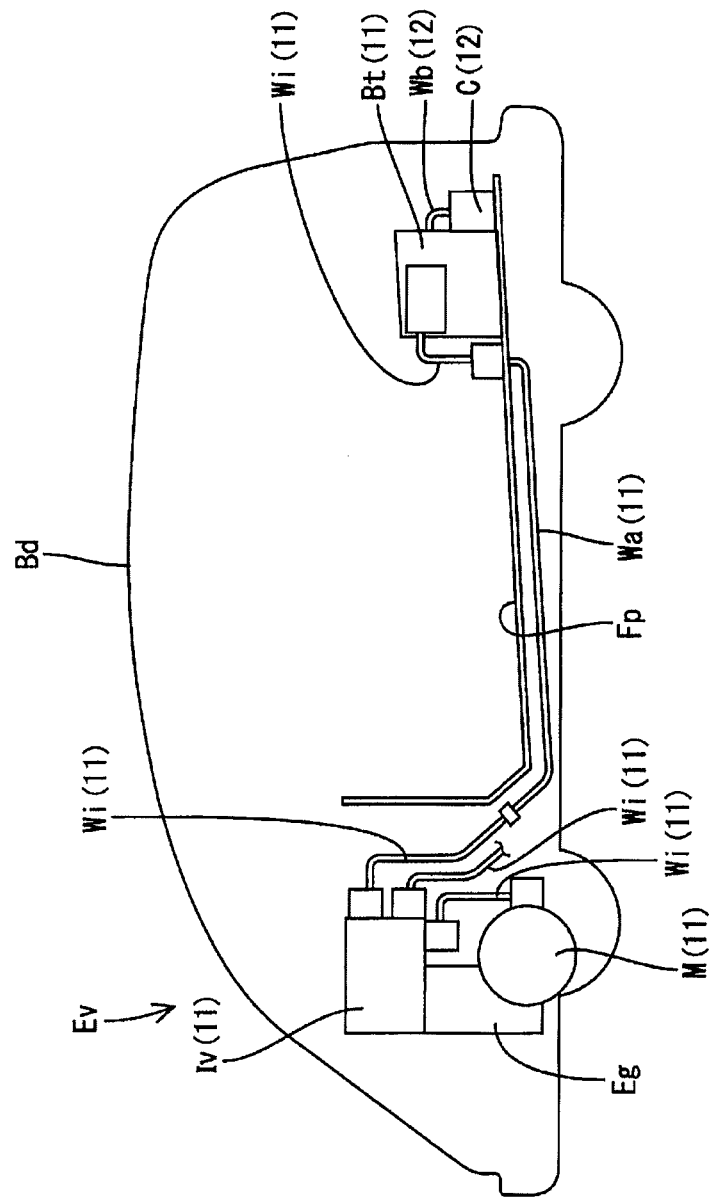
FIG. 1 is a schematic diagram illustrating a vehicle in which an overcurrent protection apparatus according one or more embodiments is installed.
Figure 2:
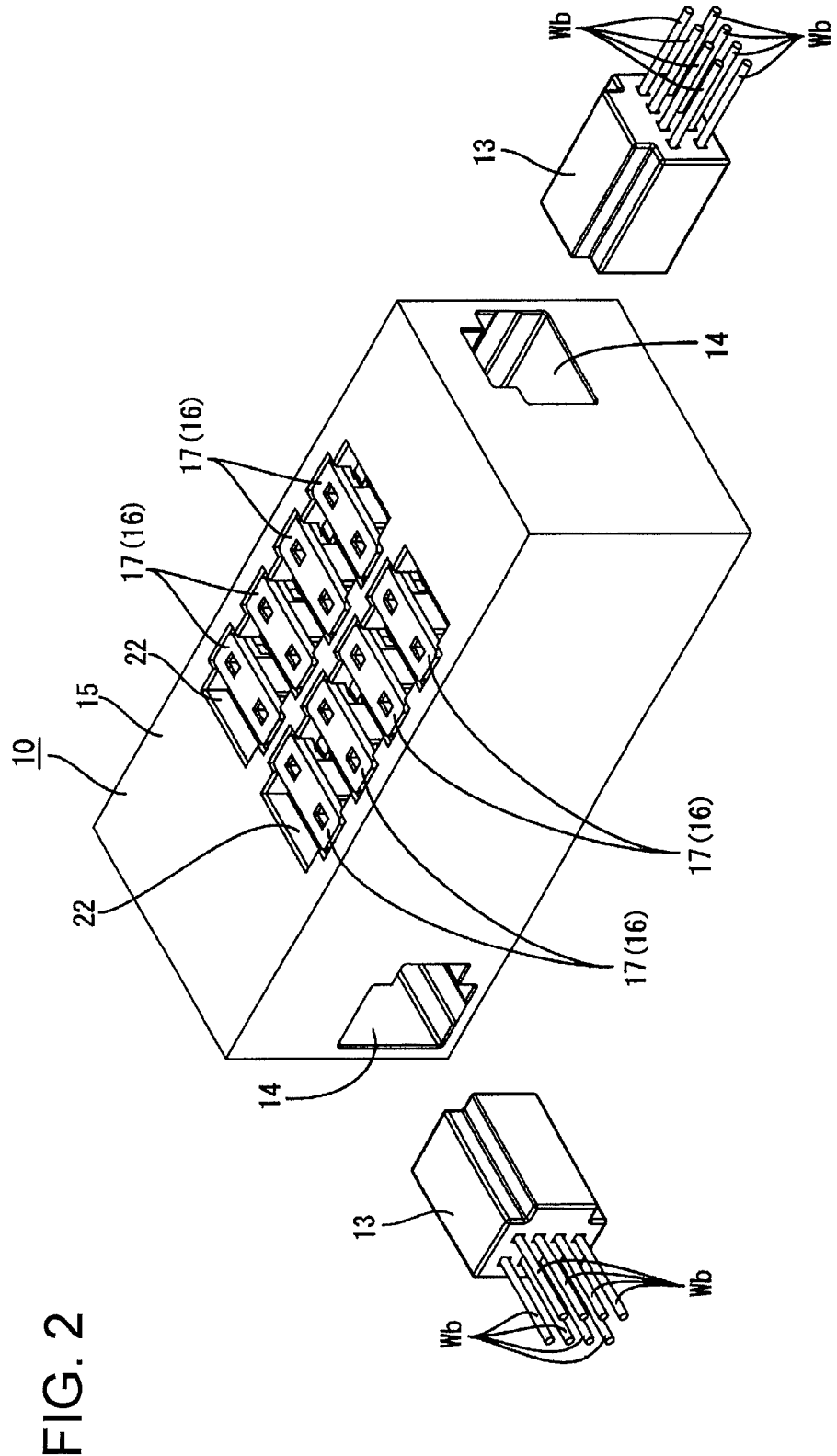
FIG. 2 is a perspective view illustrating the overcurrent protection apparatus according to one or more embodiments.

As shown in FIG. 2, the vehicle Ev includes the plurality of detection electric wires Wb. A wire-side connector 13 into which the plurality of detection electric wires Wb are inserted may be arranged at the ends of the plurality of detection electric wires Wb. The wire-side connector 13 may be connected to the overcurrent protection apparatus 10 via an apparatus-side connector 14. The overcurrent protection apparatus 10 has two apparatus-side connectors 14. The overcurrent protection apparatus 10 may be connected in series to the control circuit of the battery control unit C via the detection electric wires Wb.

During regular operation, the detection electric wires Wb may be connected to the low voltage circuit 12 in which a current with a relatively low voltage (for example, about 12 V) flows.

The overcurrent protection apparatus 10 comprises a case 15, and fuse members 16 that are arranged in the case 15. The case 15 may be made, for example, of an insulating synthetic resin. On the outer surface of the case 15, the apparatus-side connectors 14 into which the wire-side connectors 13 are fitted may be opened to the outside.

Figure 3:
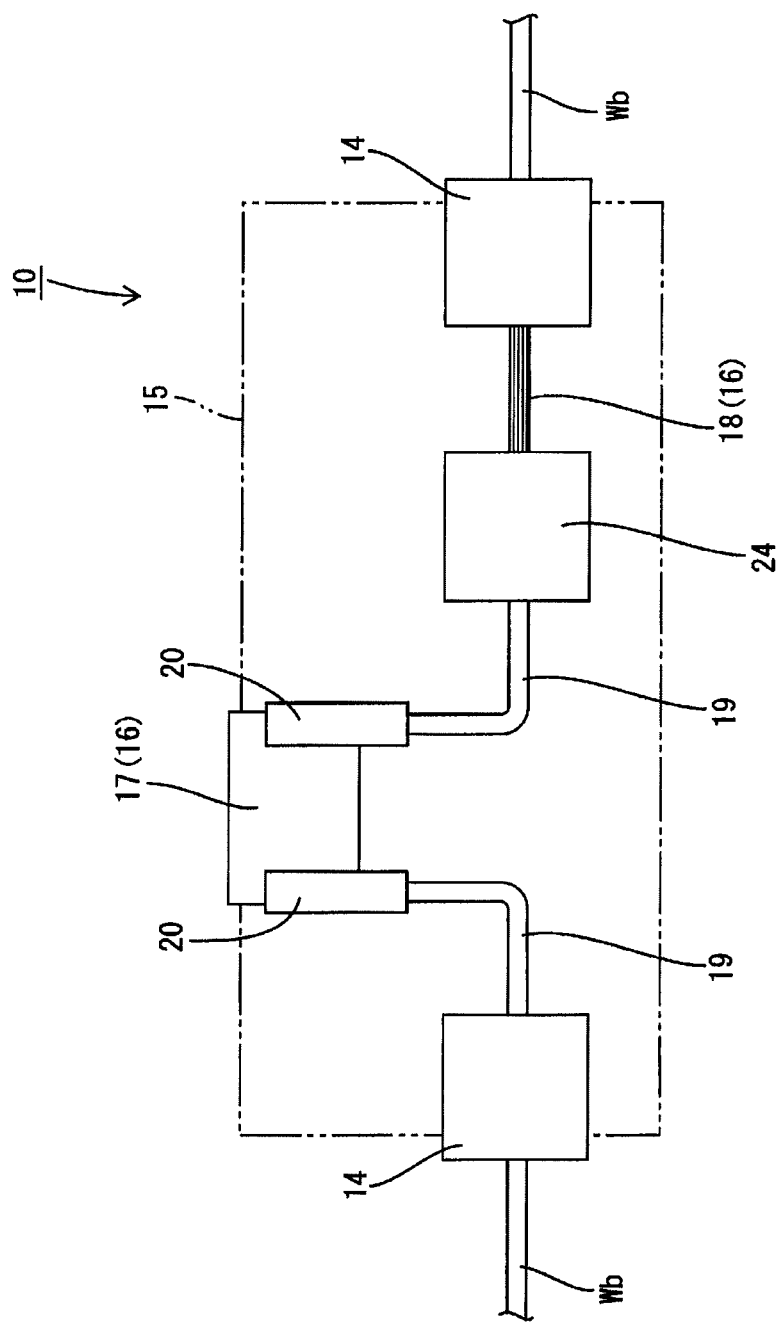
FIG. 3 is a schematic diagram illustrating a configuration of the overcurrent protection apparatus according to one or more embodiments.
Figure 4:
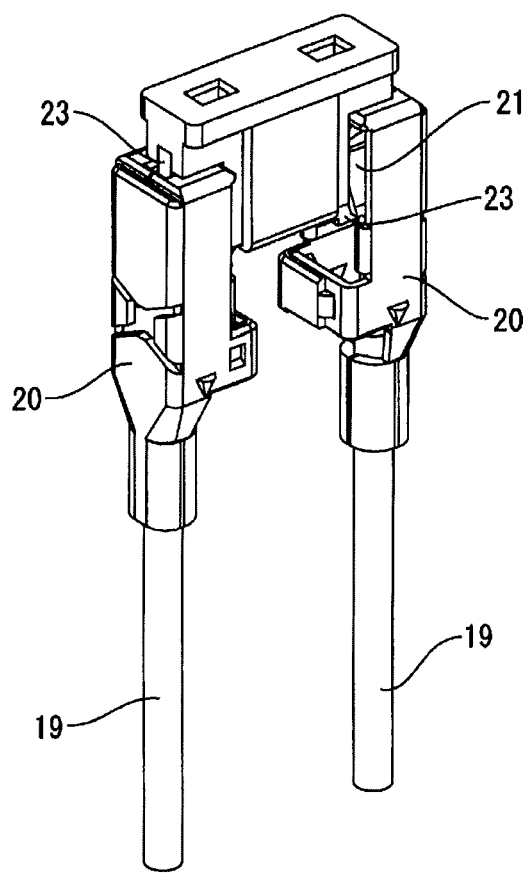
FIG. 4 is a perspective view illustrating a connection structure of a fuse according to one or more embodiments.

As shown in FIG. 3, the fuse members 16 in which fuses 17 and fusible wires 18 may be connected in series are arranged in the case 15. At least the fusible wires 18 may be accommodated inside the case 15.

One terminal of an internal electric wire 19 that is routed in the case 15 may be connected to the apparatus-side connector 14 that is located on the left side of FIG. 3 as shown. The other end of the internal electric wire 19 is connected to a fuse terminal 20 by a connection method understood by one skilled in the art, such as crimping. This fuse terminal 20 and one terminal 23 of the fuse 17 may be connected to each other by an elastic piece 21 of the fuse terminal 20 coming into contact with the terminal 23 of the fuse 17 (see FIG. 4). This fuse 17 may be a vehicle fuse 17 that is installed in a vehicle Ev such as an automobile.

The fuse 17 may be detachably mounted in a fuse mounting section 22 that is opened in the upper surface of the case 15.

The other terminal 23 of the fuse 17 may also be connected to the fuse terminal 20. The internal electric wire 19 connected to the other terminal 23 of the fuse 17 may be inserted into an internal connector 24.

A fusible wire 18 may be arranged between the internal connector 24 and the apparatus-side connector 14 that is located on the right side of FIG. 3. The fusible wire 18 may be made of a conductor, for example a conductor having a melting point lower than that of copper, and having a fusing current value that is set higher than that of the fuse 17.

In embodiments where the conductor that has a melting point lower than that of copper, the conductor may be a metal, such as lead, tin, zinc, bismuth, indium or cadmium, or an alloy containing one or more of these metals.

The fusible wire 18 may suitably be any wire such as a single core wire, a twisted wire, a naked wire, or an enamel wire, as needed. In some embodiments, an enamel wire is used.

In a case where the vehicle Ev has an accident or other abnormal event, the high voltage circuit 11 and the detection electric wires Wb may short circuit. If they short circuit, there is the concern that a current with a voltage exceeding 100 V flows through the battery control unit C that constitutes the low voltage circuit 12 via the detection electric wires Wb. In this case, it is necessary to protect the battery control unit C.

On the other hand, when a short-circuit has occurred even in the case of a current with a relatively low voltage, it is of course also necessary to protect the battery control unit C.

From the above-described points of view, in the above-described embodiment, the fuse member 16 that is connected in series to the battery control unit C includes the fuse 17, and the fusible wire 18 that is connected in series to this fuse 17. With this, when an overcurrent with a relatively low voltage flows, the fuse 17 with a relatively low fusing current value is fused. Accordingly, the overcurrent can be suppressed from flowing through the battery control unit C.

On the other hand, when an overcurrent with a relatively high voltage flows, the fuse 17 and the fusible wire 18 are fused. Since arcing occurs even when the fuse 17 is fused, the current will continue to flow through the fuse 17. Furthermore, even when the fusible wire 18 has been fused, arcing occurs between the terminals of the fused fusible wire 18. However, by the terminals of the fusible wire 18 being melted due to the heat of arcing, the distance between the terminals of the fusible wire 18 increases. Accordingly, arcing disappears and the current is interrupted. In this way, use of the fusible wire 18 eliminates the need to use the high voltage fuse 17 even when an overcurrent with a relatively high voltage flows. As a result, it is possible to reduce the manufacturing cost of the overcurrent protection apparatus 10.

Furthermore, according to the above-described embodiment, at least the fusible wire 18 may be accommodated in the case 15. Therefore, it is possible to protect members arranged in the vicinity of the overcurrent protection apparatus 10 from arcing that occurs when the fusible wire 18 is fused and from flying pieces of the fused fusible wire 18.

Furthermore, according to the above-described embodiment, the wire-side connector 13 may be arranged at the terminal of the external electric wire that is connected to the battery control unit C, and the apparatus-side connector 14 that is electrically connected to the fuse member 16 and into which the wire-side connector 13 is capable of being fitted is provided in the case 15. Accordingly, the external circuit and the overcurrent protection apparatus 10 can be easily electrically connected to each other by fitting the wire-side connector 13 and the apparatus-side connector 14 together.

Furthermore, according to the above-described embodiment, the fuse 17 may be a vehicle fuse 17. Accordingly, it is possible to reduce the manufacturing cost of the overcurrent protection apparatus 10.

Figure 5:
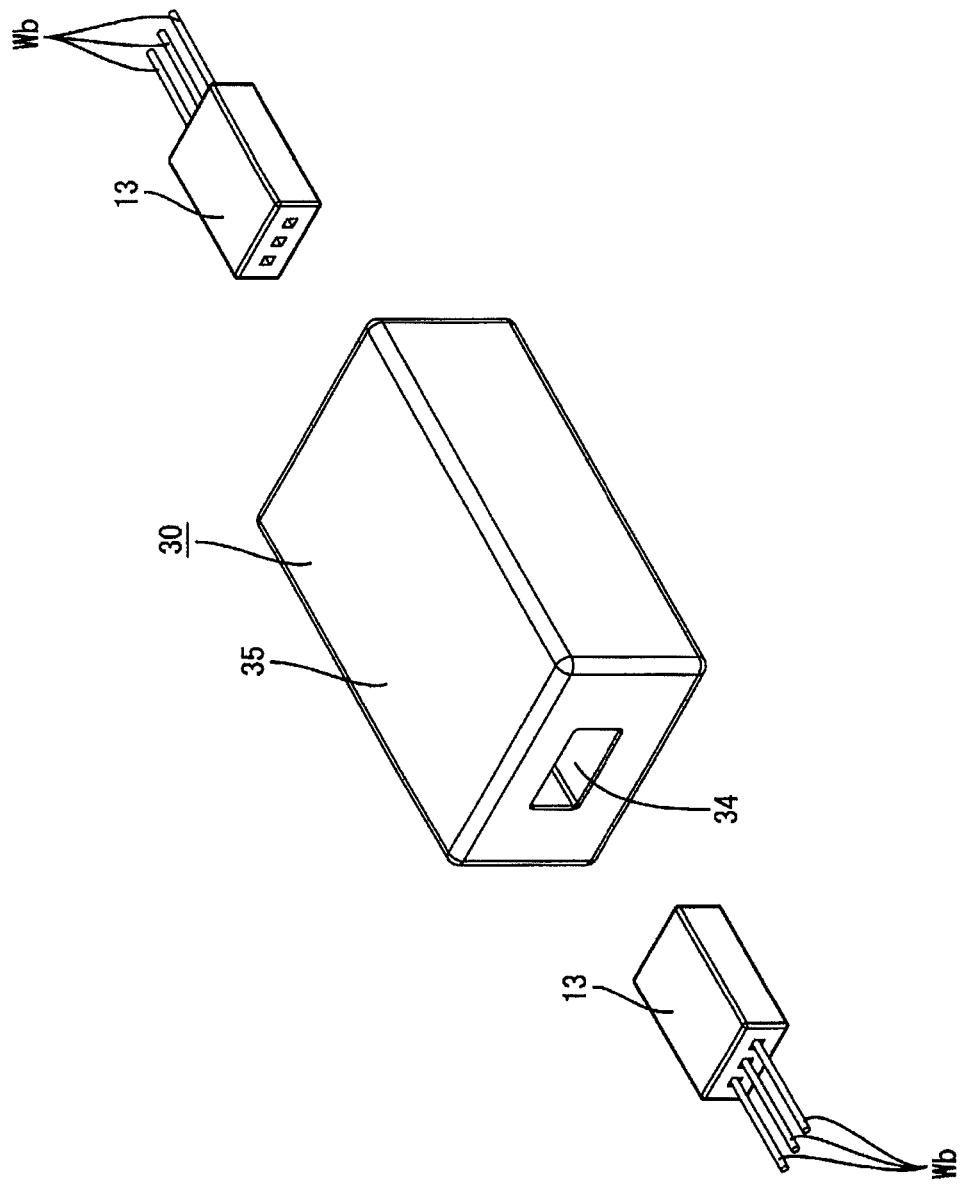
FIG. 5 is a perspective view illustrating an overcurrent protection apparatus according to one or more embodiments.

An embodiment of the present application will be described with reference to FIGS. 5 to 7. As shown in FIG. 5, in an overcurrent protection apparatus 30, two apparatus-side connectors 34 are formed in a case 35.

Figure 6:
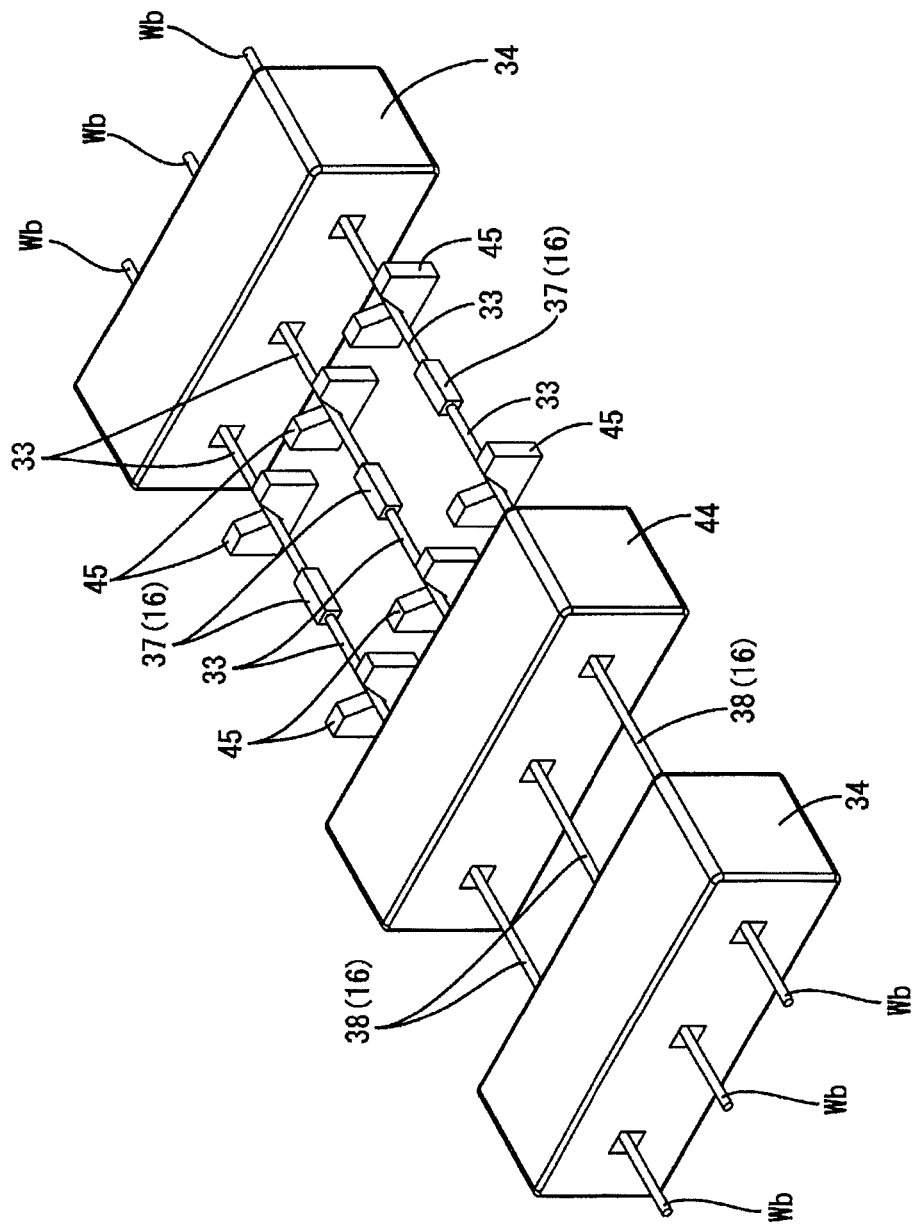
FIG. 6 is a perspective view illustrating the overcurrent protection apparatus according to one or more embodiments.
Figure 7:
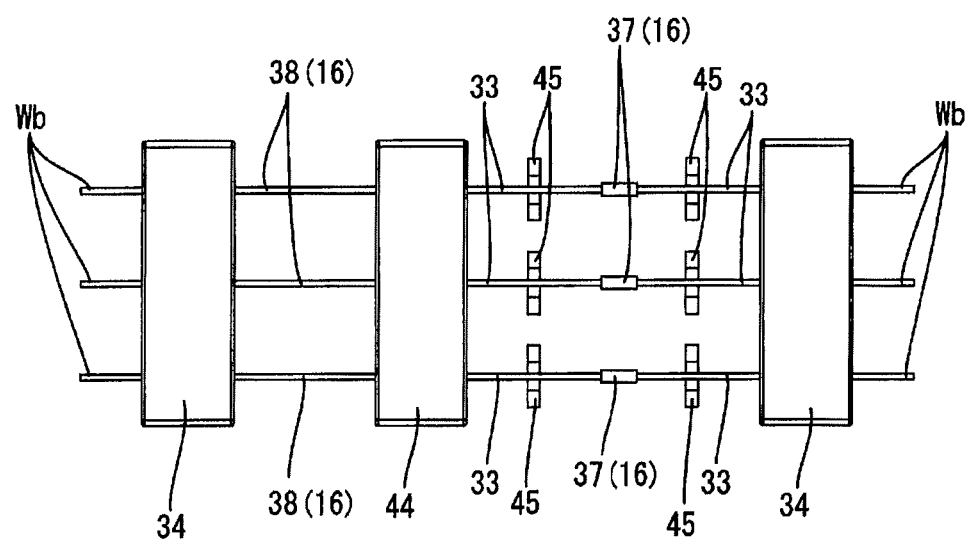
FIG. 7 is a plan view illustrating a fuse member of the overcurrent protection apparatus according to one or more embodiments.

FIGS. 6 and 7 show a configuration of the inside of the case 35. Three fusible wires 38 may be connected to the apparatus-side connector 34 located on the left side of FIG. 7 as shown. These fusible wires 38 may be respectively connected to three fuses 37 via an internal connector 44.

A pair of terminals 33 protrudes from two ends of the fuse 37. The terminals 33 may be metal rod-shaped terminals. The pair of terminals 33 may be supported by supporting members 45. One of the terminals of the pair of terminals 33 may be connected to the internal connector 44, and the other of the terminals of the pair of terminals 33 may be connected to the apparatus-side connector 34 located on the right side of FIG. 7 as shown.

Configurations other than the above-described configurations are substantially the same as those as the embodiment described within the description of FIGS. 1 to 4, and thus the same reference numerals are given to the same members and descriptions thereof are omitted.

According to the present embodiment, because the configuration of the case 35 can be simplified, it is possible to further reduce the manufacturing cost of the overcurrent protection apparatus 30.

Hereinafter, an embodiment according to the present application will be described with reference to FIGS. 8 to 10.

Figure 8:
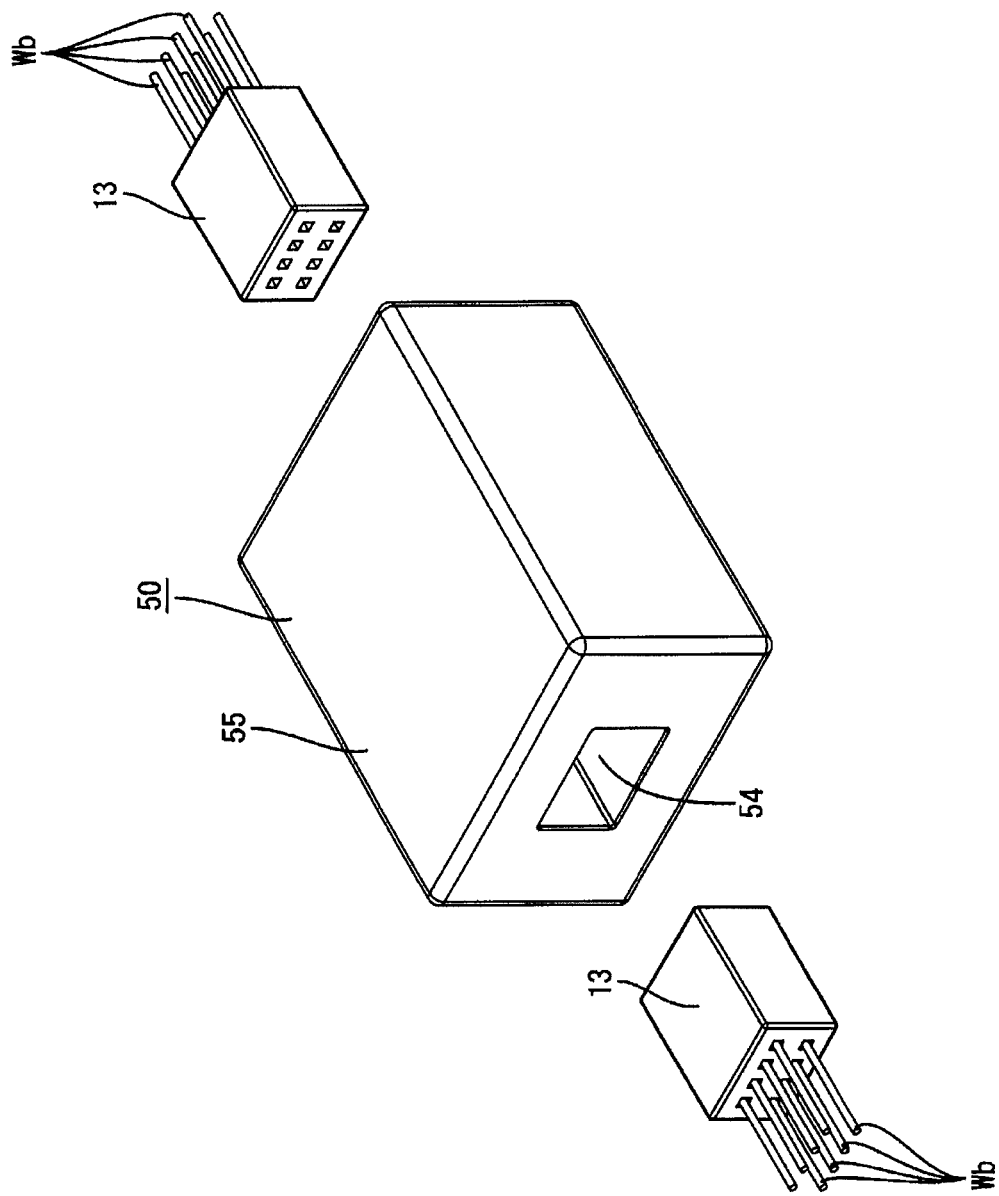
FIG. 8 is a perspective view illustrating an overcurrent protection apparatus according to one or more embodiments.

As shown in FIG. 8, in an overcurrent protection apparatus 50 according to the present embodiment, two apparatus-side connectors 54 may be formed in a case 55.

Figure 9:
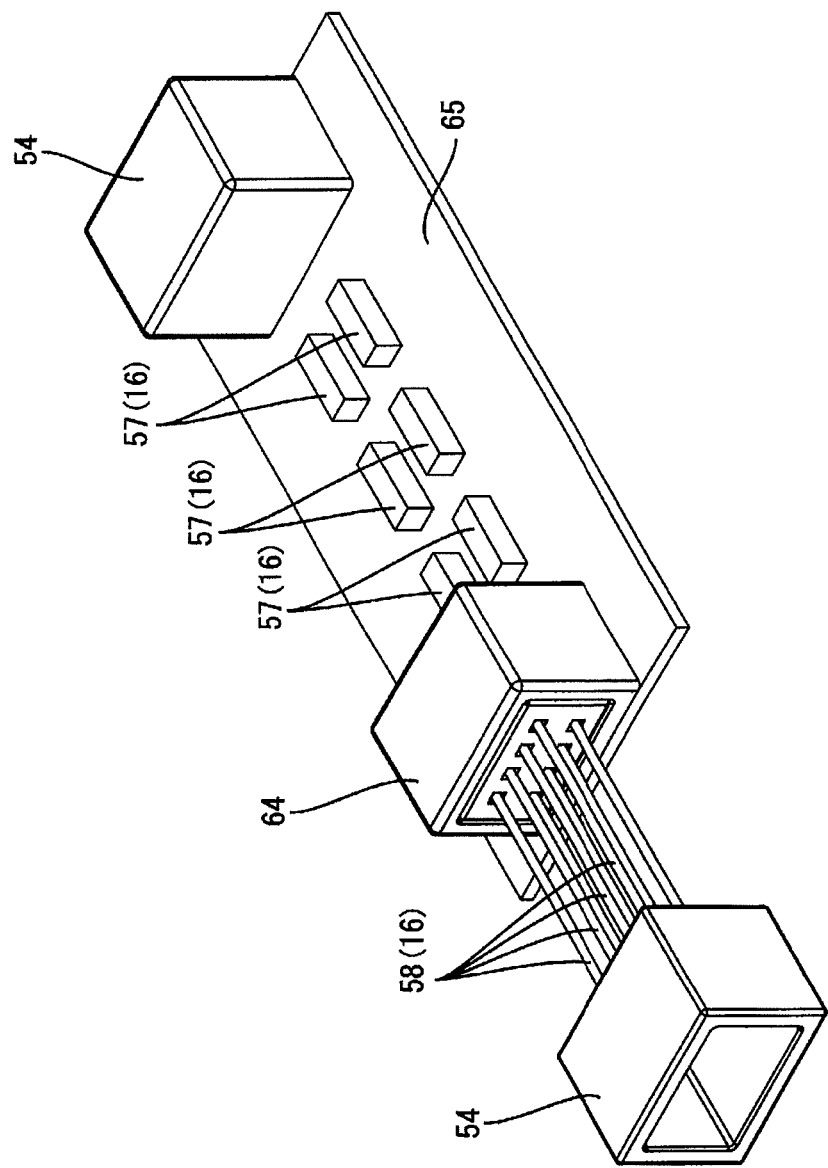
FIG. 9 is a perspective view illustrating a fuse member of the overcurrent protection apparatus according to one or more embodiments.
Figure 10:
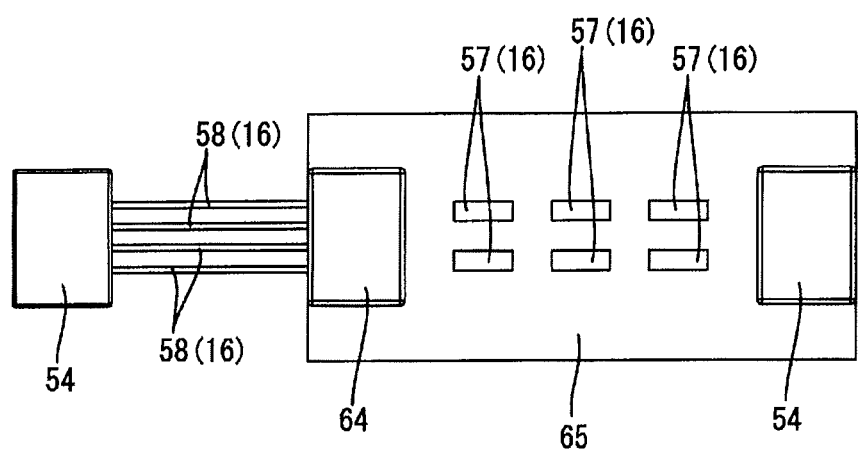
FIG. 10 is a plan view illustrating the fuse member of the overcurrent protection apparatus according to one or more embodiments.

FIGS. 9 and 10 show the configuration of the inside of the case 55. A plurality of fusible wires 58 may be connected to the apparatus-side connector 54 located on the left side of FIG. 9. These fusible wires 58 are connected to an internal connector 64.

The internal connector 64 may be mounted on a printed board 65. On the printed board 65, electrically conducting paths (not shown) may be formed by a printed wiring technique. The fusible wires 58 may be connected to the electrically conducting paths on the printed board 65 by a well-known technique such as soldering.

A plurality of fuses 57 may be mounted on the printed board 65. The fuse 57 according to the present embodiment may be a fuse 57 for substrate. Each fuse 57 may be connected to the electrically conducting path on the printed board 65 by a well-known method such as soldering. With this, each fusible wire 58 may be connected in series to the fuses 57.

An apparatus-side connector 54 located on the right side of FIG. 10 as shown may be mounted on the printed board 65, and is connected to the electrically conducting paths on the printed board 65 by a well-known method such as soldering.

Configurations other than the above-described configurations are substantially the same as those in the embodiment described within the description of FIGS. 5 to 7, and thus the same reference numerals are given to the same members and descriptions thereof are omitted.

According to the present embodiment, because the fuses 57 are mounted on the printed board 65, it is possible to downsize the overcurrent protection apparatus.

The present application is not limited to the foregoing embodiments explained in the above description with reference to the drawings, and the technical scope of the present invention encompasses, for example, the following embodiments.

(1) Although the overcurrent protection apparatuses 10, 30, and 50 according to the foregoing embodiments are configured to be installed in the vehicle Ev, the present application is not limited to this and the overcurrent protection apparatus can appropriately be installed in any apparatus, such as a computer or a communication apparatus.

(2) Although the foregoing embodiments have a configuration in which a plurality of fuse members 16 are arranged in one case 15, the present application is not limited to this and a configuration is also possible in which only one fuse member 16 is arranged in one case 15.

(3) Although the foregoing embodiments have a configuration in which the fuse members 16 are arranged in the case 15, the present application is not limited to this and the case 15 may be omitted.

(4) Although in an embodiment the internal connector 24 is interposed between the fuses 17 and the fusible wire 18, the present application is not limited to this and the internal connector 24 may be omitted by connecting the fusible wire 18 to the fuse terminal 20.

LIST OF REFERENCE NUMERALS 10, 30, 50 Overcurrent protection apparatus
11 High voltage circuit
12 Low voltage circuit
13 Wire-side connector
14, 34, 54 Apparatus-side connector 15, 35 Case
17, 37, 57 Fuse
18, 38, 58 Fusible wire
65 Printed board
Bt Battery module (high voltage circuit)
C Battery control unit (external circuit, low voltage circuit)
Ev Vehicle
Iv Inverter (high voltage circuit)
M Motor (high voltage circuit)
Wa Exterior wire harness (high voltage circuit)
Wb Detection electric wire (external electric wire, low voltage circuit)
Wi Interior wire harness (high voltage circuit)

The invention claimed is:

1. An overcurrent protection apparatus to be installed in a vehicle provided with a low voltage circuit through which a current with a low voltage flows and a high voltage circuit through which a current with a high voltage flows, the high voltage being higher than the low voltage, the overcurrent protection apparatus being connectable to the low voltage circuit to protect the low voltage circuit from an overcurrent, the overcurrent protection apparatus comprising at least one fuse member comprising a fuse and a fusible wire that is connected in series to the fuse, the fusible wire comprising a conductor that has a melting point lower than that of copper, and having a fusing current value that is higher than that of the fuse,
wherein the at least one fuse member is connected in series to the low voltage circuit.

2. The overcurrent protection apparatus according to claim 1,
wherein the high voltage circuit includes a battery module in which a plurality of electric cells are connected in series, and the low voltage circuit includes detection electric wires that detect states of the electric cells.

3. The overcurrent protection apparatus according to claim 1,
wherein the fuse is adaptable for use in a vehicle.

4. The overcurrent protection apparatus according to claim 1, further comprising a plurality of fuse members.

5. The overcurrent protection apparatus according to claim 1, wherein the fusible wire is connected to the fuse by means of an internal connector interposed between the fuse and the fusible wire.

6. The overcurrent protection apparatus according to claim 1, wherein at least the fusible wire is accommodated in a case.

7. The overcurrent protection apparatus according to claim 1,
wherein a wire-side connector is arranged at an end of an external electric wire that is connected to the external circuit, and
an apparatus-side connector that is electrically connected to the at least one fuse member and into which the wire-side connector is capable of being fitted is provided in the case.

8. The overcurrent protection apparatus according to claim 1, wherein the fuse is mounted on a printed board.

* * * * *